(12) United States Patent
Huang

(10) Patent No.: US 11,532,263 B2
(45) Date of Patent: Dec. 20, 2022

(54) METHOD AND DEVICE FOR MONITORING LUMINOUS INTENSITY OF DISPLAY PIXEL

(71) Applicant: SHANGHAI HARVEST INTELLIGENCE TECHNOLOGY CO., LTD., Shanghai (CN)

(72) Inventor: Jiandong Huang, Shanghai (CN)

( * ) Notice: Subject to any disclaimer, the term of this patent is extended or adjusted under 35 U.S.C. 154(b) by 0 days.

(21) Appl. No.: 16/910,105

(22) Filed: Jun. 24, 2020

(65) Prior Publication Data

US 2020/0402448 A1  Dec. 24, 2020

Related U.S. Application Data

(63) Continuation-in-part of application No. PCT/CN2018/071542, filed on Jan. 5, 2018.

(30) Foreign Application Priority Data

Dec. 25, 2017 (CN) .......................... 201711422047.7

(51) Int. Cl.
*G09G 3/32* (2016.01)

(52) U.S. Cl.
CPC .......... *G09G 3/32* (2013.01); *G09G 2320/029* (2013.01); *G09G 2320/043* (2013.01); (Continued)

(58) Field of Classification Search
CPC .......... G06F 3/0412; G06F 3/042–0428; G06F 2203/04109; G09G 3/32–3291; G09G 2320/0233; G09G 2320/0242; G09G 2320/029; G09G 2320/0295; G09G 2320/046; G09G 2320/0626;
(Continued)

(56) References Cited

U.S. PATENT DOCUMENTS

| 2009/0322677 A1* | 12/2009 | Lee ...................... G06F 3/0421 345/158 |
| 2010/0149146 A1* | 6/2010 | Yamashita ........... G09G 3/3233 345/207 |

(Continued)

FOREIGN PATENT DOCUMENTS

| CN | 102929449 | 2/2013 |
| CN | 103425351 | 12/2013 |

(Continued)

*Primary Examiner* — Nathan Danielsen

(57) ABSTRACT

A method and device for monitoring luminous intensity of display pixel is provided. The device includes self-luminous LED display, optical glue, photo-detecting array film and processing chip. The optical glue is attached to lower surface of the self-luminous LED display. The photo-detecting array film is disposed under the optical glue. The self-luminous LED display includes display pixels. Each display pixel includes a luminescent layer. The refractive index of the optical glue is smaller than that of the cover glass. The device uses the optical glue to filter the reflected light in the effective area corresponding to each display pixel. After that, the processing chip calculates the luminous intensity of the display pixel according to the first reflected optical signal detected by the photo-detecting array film. When it is determined that the luminous intensity of the display pixel is not changed in the preset period, a feedback signal is transmitted.

10 Claims, 14 Drawing Sheets

(52) U.S. Cl.
CPC ... *G09G 2320/046* (2013.01); *G09G 2330/12* (2013.01); *G09G 2360/145* (2013.01)

(58) Field of Classification Search
CPC ..... G09G 2320/066; G09G 2320/0666; G09G 2320/0693; G09G 2330/10; G09G 2330/12; G09G 2360/14; G09G 2360/145; G09G 2360/147; G06K 9/0004; G06K 9/00046
See application file for complete search history.

(56) References Cited

U.S. PATENT DOCUMENTS

| | | | |
|---|---|---|---|
| 2013/0120760 A1* | 5/2013 | Raguin | G06K 9/0004 356/612 |
| 2018/0012069 A1* | 1/2018 | Chung | G06K 9/2036 |
| 2019/0165299 A1 | 5/2019 | Bookbinder et al. | |

FOREIGN PATENT DOCUMENTS

| | | |
|---|---|---|
| CN | 103786494 | 5/2014 |
| CN | 103829959 | 6/2014 |
| CN | 107004130 | 8/2017 |

\* cited by examiner

METHOD AND DEVICE FOR MONITORING LUMINOUS INTENSITY OF DISPLAY PIXEL

BACKGROUND OF THE INVENTION

1. Field of the Invention

The present disposure relates to application field of an optical component, and more particularly relates to a method and a device and for monitoring the luminous intensity of display pixels.

2. Description of the Prior Art

The current display panel technology, whether it is a liquid crystal display (LCD), an active matrix organic light-emitting diode (AMOLED) display screen, or a micro-LED display screen, etc., all of them scan and drive a single pixel through a film transistor (TFT) structure to realize the display function of the on-screen pixel array. The main structure for forming the TFT switching function is a semiconductor field effect transistor (FET), and the well-known semiconductor layer is mainly made of amorphous silicon, polycrystalline silicon, indium gallium zinc oxide (IGZO), or an organic compound mixed with carbon nano materials. The structure of a photo diode may also be ready by such semiconductor materials and the production equipment is also compatible with the production equipment of the TFT array, so the prepared photodiode can be directly integrated with TFT and use TFT to scan and drive the photodiode. Therefore, the TFT photodiode has started to be produced by a TFT array preparation method in recent years and is widely used in X-ray sensing flat panel devices, such as those described in the patents CN 103829959B and CN 102903721B of the People's Republic of China.

In contrast to image sensor devices made of traditional crystalline materials, the band gap of the TFT Photo-detecting array film material mainly uses visible light as the main absorption range, so it is more susceptible to interference from ambient visible light to form noise. Thus, the signal-to-noise ratio (SNR) is low. Limited by this, the initial application of the TFT light sensing array is mainly based on X-ray sensing flat panel devices. The main reason is that X-rays are short-wavelength light with great accuracy. The X-ray image first enters the light wavelength conversion material on the sensing plate. X-ray image is converted into longer wavelength visible light, and then the visible light is directly transmitted to the TFT Photo-detecting array film in the sensing flat panel to avoid the noise interference caused by the visible light of the surrounding environment, such as those described in the patents CN 103829959B and CN 102903721B of the People's Republic of China.

If such a well-known TFT Photo-detecting array film is arranged in the display structure, it can be used as an implementation solution for integrating the light detection function in the display. Taking the organic light-emitting diode (AMOLED) display screen as an example, it is an active matrix composed of TFT circuits that scans and drives each diode display pixel to realize the display function of the active matrix organic diode (AMOLED).

At present, the AMOLED display is a high-end display device capable of mass production, which is widely used in mobile terminal devices such as smart phones. In contrast to TFT-LCD, the AMOLED display includes the advantages of low power consumption, high color saturation, thin and light volume, etc. However, AMOLED still has shortcomings such as the short lifespan of OLED pixels or unstable light emission color. In the actual application process, when the user uses the screen for a long time or the screen fixedly displays high-contrast images, the display pixels of AMOLED will generate image retention, color yellowing, or aging, the so-called "burn-in" phenomenon, which affects the user's sensory experience.

In order to avoid the "burn-in" phenomenon, the following solutions have been proposed in the prior art: A single phototransistor or a single photodiode light sensing pixel is integrated into an active matrix to serve as a feedback sensor device for monitoring the luminescence of a single OLED pixel. In addition, the feedback sensor device is used to detect whether the screen has the "burn-in" phenomenon. The specific circuit design structure is shown in FIG. 1. A represents the active matrix, T represents a TFT gate switch, and C represents a capacitor.

Although the photodiode or phototransistors can integrate the light detection function to the display, but TFT manufacturing process of the active matrix becomes more difficult and complicated, which can be seen from FIG. 1. Therefore, the yield and manufacturing cost of the active matrix backplane of the OLED display are seriously affected. At the same time, because the low collimation of the light emitting angle of the OLED light, the large-angle light emission in the display panel will cause a lot of stray light in the active matrix backplane. It is difficult to accurately determine the luminous intensity of a single light-emitting diode. In addition, in the existing TFT to OLED scan drive function, for photodiodes or phototransistors, functions such as scanning driver for light sensing and closed-loop feedback adjustment of light intensity of corresponding display pixels are also required.

The cost and difficulty of the display driver chip are increased.

SUMMARY OF THE INVENTION

For this reason, it is necessary to provide a technical scheme for monitoring the luminous intensity of display pixels to solve the device structure of the phenomenon of "burn-in" of the existing monitoring display screen and the problems of complicated production process and high hardware costs.

To achieve the above objective, a device for monitoring luminous intensity of display pixel is provided in the invention. The device includes a cover glass, a touch screen, a self-luminous LED display, an optical glue, an optical component and a photo-detecting array film from top to bottom. The touch screen is attached to the lower surface of the cover glass. The optical glue is attached to the lower surface of the self-luminous LED display. The refractive index of the optical glue is smaller than the refractive index of the cover glass. The self-luminous LED display includes a plurality of display pixels. The device includes a processing chip.

The processing chip is configured to transmit a display driving signal to a self-luminous LED display when the touch screen detects touch signals of a physiological feature part.

The display pixel is configured to emit an optical signal after receiving a display driving signal from the processing chip. A part of the optical signal is reflected on the upper surface of the cover glass and formed as a reflected optical signal.

The optical glue is configured to filter a part of the reflected optical signal whose incident angle toward the optical glue is greater than a first critical angle, so that the other part of the reflected optical signal not filtered is formed as a first reflected optical signal. The first critical angle is the critical angle at which the reflected optical signal totally reflected on the surface of the optical glue.

The optical component is configured to filter a part of the first reflected optical signal so as to form a second reflected optical signal. The part of the first reflected optical signal filtered by the optical component is formed from a part of the optical signal with an incident angle toward the cover glass smaller than a second critical angle, and the second critical angle is a critical angle at which the optical signal is totally reflected on the upper surface of the cover glass.

In some embodiment, the processing chip is configured to drive each display pixel sequentially on the display or a display pixel array to emit the optical signal according to a preset timing electrical signal. The processing chip is also configured to transmit the feedback signal when it is determined that luminous intensity of the display pixel or the display pixel array is not changed in the preset period. The display pixel array comprises a discrete display pixel array or a continuous display pixel array.

In some embodiment, the photo-detecting array film comprises P*Q pixel detection areas. Each pixel detection area is corresponding to a pixel detection structure. Each pixel detection structure includes a pixel thin film circuit composed of at least one thin film transistor and a light detection unit.

The light detection unit includes a photodiode or a phototransistor.

In some embodiment, the optical component comprises a optical shading component and a phase changing optical component. The optical shading component comprises a periodical pinhole array or a non-periodical pinhole array. The phase changing optical component comprises a photonic crystal structure or a micro-lens array structure whose refractive index changes periodically, or a diffusing-scattering structure whose refractive index changes non-periodically.

A method for monitoring luminous intensity of display pixel is also provided in the invention. The method is used in a device for monitoring luminous intensity of display pixel. The device includes a cover glass, a touch screen, a self-luminous LED display, an optical glue, an optical component, and a photo-detecting array film from top to bottom. The touch screen is attached to the lower surface of the cover glass. The optical glue is attached to the lower surface of the self-luminous LED display. The refractive index of the optical glue is smaller than the refractive index of the cover glass. The self-luminous LED display includes a plurality of display pixels. The device further includes a processing chip. The method includes the following steps:

The processing chip transmits a display driving signal to a self-luminous LED display when the touch screen detects touch signals of a physiological feature part.

The luminescent layer of the display pixel emits an optical signal after receiving a display driving signal from the processing chip. A part of the optical signal is reflected on the upper surface of the cover glass and formed as a reflected optical signal.

The optical glue filters a part of the reflected optical signal whose incident angle toward the optical glue is greater than a first critical angle, so that the other part of the reflected optical signal not filtered is formed as a first reflected optical signal, and the first critical angle is the critical angle at which the reflected optical signal totally reflected on the surface of the optical glue.

The optical component filters a part of the first reflected optical signal so as to form a second reflected optical signal which enters the photo-detecting array film. The part of the first reflected optical signal to be filtered is formed from a part of the optical signal whose incident angle toward the cover glass is smaller than a second critical angle, and the second critical angle is a critical angle at which the optical signal is totally reflected on the upper surface of the cover glass.

The processing chip is configured to calculate the luminous intensity of the display pixel according to the second reflected optical signal.

In some embodiment, the method includes that the processing chip drives each display pixel sequentially on the display or a display pixel array to emit the optical signal according to a preset timing electrical signal, and the processing chip also transmits the feedback signal when it is determined that luminous intensity of the display pixel or the display pixel array is not changed in the preset period. The display pixel array comprises a discrete display pixel array or a continuous display pixel array.

In some embodiment, the photo-detecting array film includes P*Q pixel detection areas. Each pixel detection area is corresponding to a pixel detection structure. Each pixel detection structure includes a pixel thin film circuit composed of at least one thin film transistor and a light detection unit.

The light detection unit includes a photodiode or a phototransistor.

In some embodiment, the optical component comprises a optical shading component and a phase changing optical component. The optical shading component comprises a periodical pinhole array or a non-periodical pinhole array. The phase changing optical component comprises a photonic crystal structure or a micro-lens array structure whose refractive index changes periodically, or a diffusing-scattering structure whose refractive index changes non-periodically.

In contrast to the existing technology, a method and device for monitoring luminous intensity of display pixel is provided in the present disclosure. The device includes a self-luminous LED display, an optical glue, a photo-detecting array film and a processing chip. The optical glue is attached to the lower surface of the self-luminous LED display. The photo-detecting array film is disposed under the optical glue. The self-luminous LED display includes a plurality of display pixels. The display pixel includes a luminescent layer. A cover glass is disposed above the display pixel. The refractive index of the optical glue is smaller than the refractive index of the cover glass. The above device uses the principle of total reflection to filter out the reflected light in the effective area corresponding to each display pixel. After that, the processing chip is configured to calculate the luminous intensity of the display pixel according to the first reflected optical signal detected by the Photo-detecting array film. When it is determined that the luminous intensity of the display pixel is not changed in the preset period, a feedback signal is transmitted. In the present disclosure, the photo-detecting array film detects the reflected optical signal of the display pixel to determine whether the display screen is "burn-in". The present disclosure has the characteristics of high recognition and easy processing, which effectively reduces the processing costs.

DESCRIPTION OF THE PREFERRED EMBODIMENTS

Figure 1:
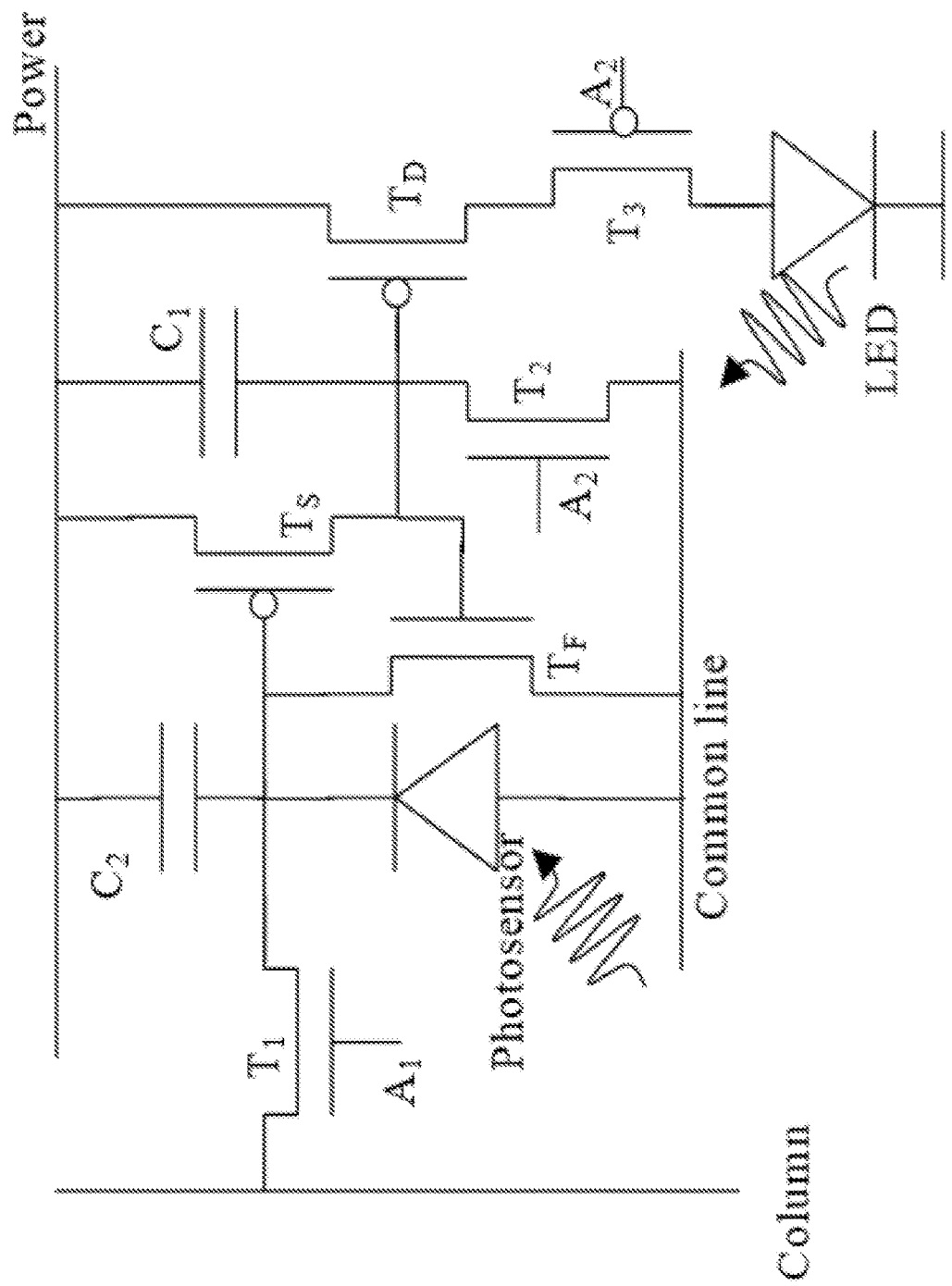
FIG. 1 is a circuit structure diagram of the "burn-in" scheme for detecting screens via the feedback sensor device in the background of the present disclosure.

In order to explain the technical content, structural features, achieved objectives, and effects of the technical solution in detail, the following describes it in detail with reference to specific embodiments and accompanying drawings.

A device for monitoring luminous intensity of display pixel is provided in the present disclosure. The device could be used to detect the luminous intensity of the display pixel of the display. The processor determines whether the "burn-in" phenomenon occurs in the self-luminous LED display according to the luminous intensity of the display pixel. A feedback signal is transmitted to trigger a "burn-in" processing scheme for processing and resolution.

The device includes a self-luminous LED display 2, an optical glue 4, a photo-detecting array film 3 and a processing chip. The optical glue 4 is attached to the lower surface of the self-luminous LED display 2. The photo-detecting array film 3 is disposed under the optical glue. The self-luminous LED display 2 includes a plurality of display pixels 21. The display pixel 21 includes a luminescent layer. A cover glass is disposed above the display pixel 21. The refractive index of the optical glue 4 is smaller than the refractive index of the cover glass.

In the embodiment, the cover glass refers to the cover glass substrate which is a part of the display screen (i.e., the cover glass substrate disposed above the display pixel, each display pixel sharing a cover glass.) or not a part of the display screen. For example, the cover glass is disposed above the display screen. A touch screen can also be disposed at bottom surface of the cover glass above the display screen. Because the refractive indexes of the touch screen and the cover glass are similar, the cover glass and the touch screen are simplified into one body for convenience of description in all drawings of the present disclosure. It is recorded as a cover glass/touch screen 1. When the change of the optical path is described, the change of the optical path on the surface of the cover glass/touch screen 1 is simplified to the change of the optical path on the surface of the cover glass. The optical path of the reflection on the cover glass substrate that is above the display pixel is similar to the reflection on the surface of the cover glass/touch screen 1.

When the photo-detecting array film is arranged below the display screen structure, the light from a light source, such as a display pixel or a display pixel array, will be reflected after illuminating the cover glass substrate (the display pixel array can be one row or one column of display pixels, or a plurality of display pixels arranged periodically or non-periodically). The photo-detecting array film can detect the reflected optical signal, so as to realize the real-time monitoring of the luminous intensity of each display pixel or the display pixel array. And, the photo-detecting array film determines whether the display screen has the "burn-in" phenomenon according to the monitoring results.

Figure 13:
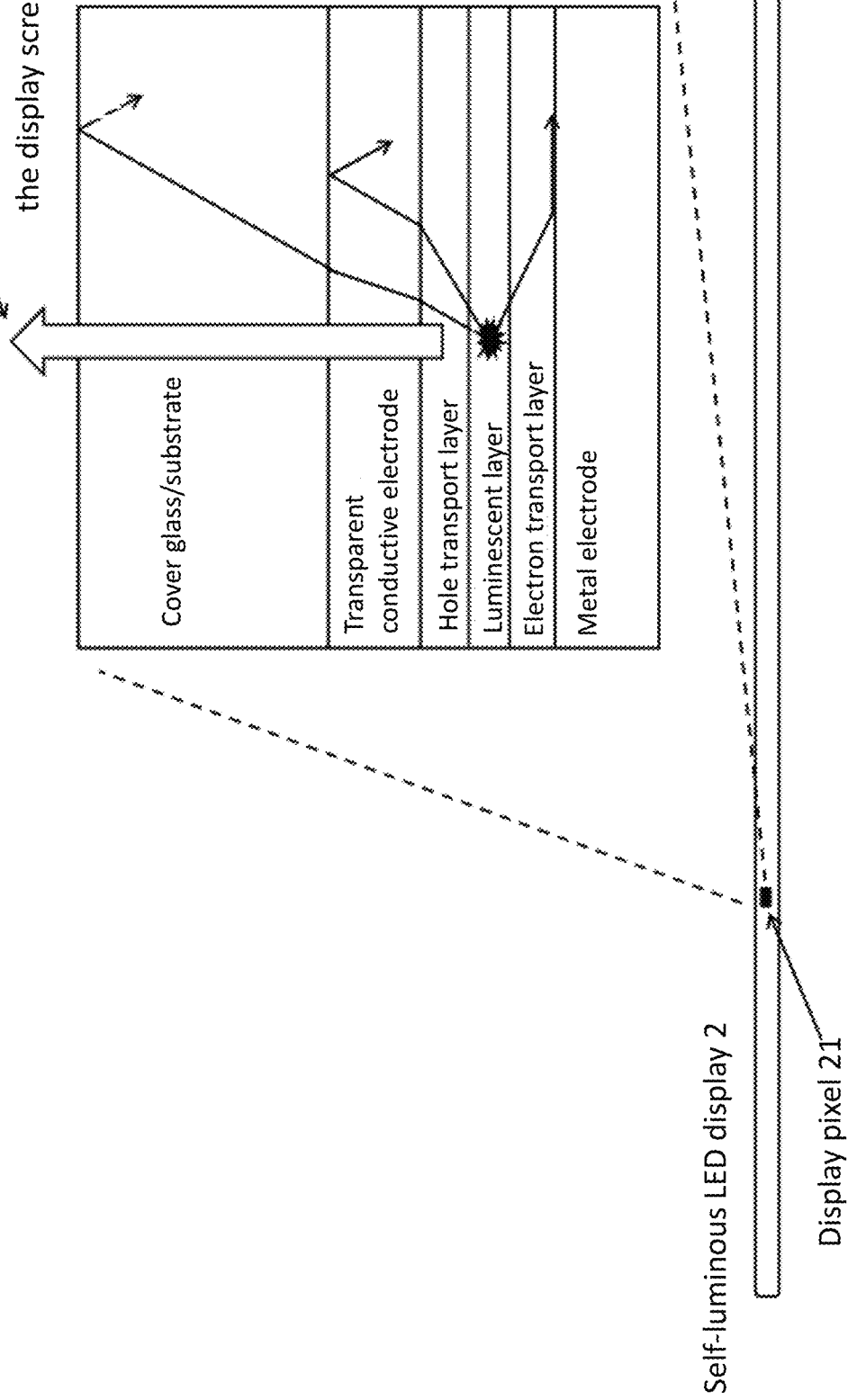
FIG. 13 is a structure schematic diagram of each display pixel of an embodiment of the present disclosure.

The luminescent layer of the display pixel 21 is configured to emit an optical signal after receiving a display driving signal transmitted from the processing chip. The optical signal is reflected on the upper surface of the cover glass to form a reflected optical signal. As shown in FIG. 13, it is a structure schematic diagram of each display pixel of an embodiment of the present disclosure. The single light-emitting display pixel includes a hole transport layer, a luminescent layer and a light emitting diode formed by an electron transport layer. The light-emitting diode respectively uses the bottom metal electrode and the transparent conductive layer, which is required for emitting light upward, as electrodes, so as to be connected to the TFT circuit to receive the scan driving electrical signal generated by the processing chip to realize the light-emitting function. As shown in FIG. 13, when the light-emitting diode receives an external driving bias voltage from the electrode and excites the hole and the electron to combine, so as to generate an excited light. However, because the display pixel of the single light-emitting diode has at least six layers of different materials (i.e., a contact surface between adjacent materials), the optical signal emitted by the display pixels will have different losses at each interface. It includes downward reflected light loss or surface plasma loss induced on the surface of the metal electrode. Thus, the stimulated luminescence actually emitting upwards out of the substrate is less than 20% of the original stimulated luminescence intensity. At the same time, there will be more than 30% of the reflected light downward that is invalid and cannot be used for display. In short, a large part of the optical signal emitted by the luminescent layer is lost inside the display screen and cannot be emitted through the cover glass. A part of the optical signal will be emitted downward through the gap of the metal electrode below, and the part of the optical signal cannot be emitted upward because it cannot reach the surface of the cover glass.

Figure 14:
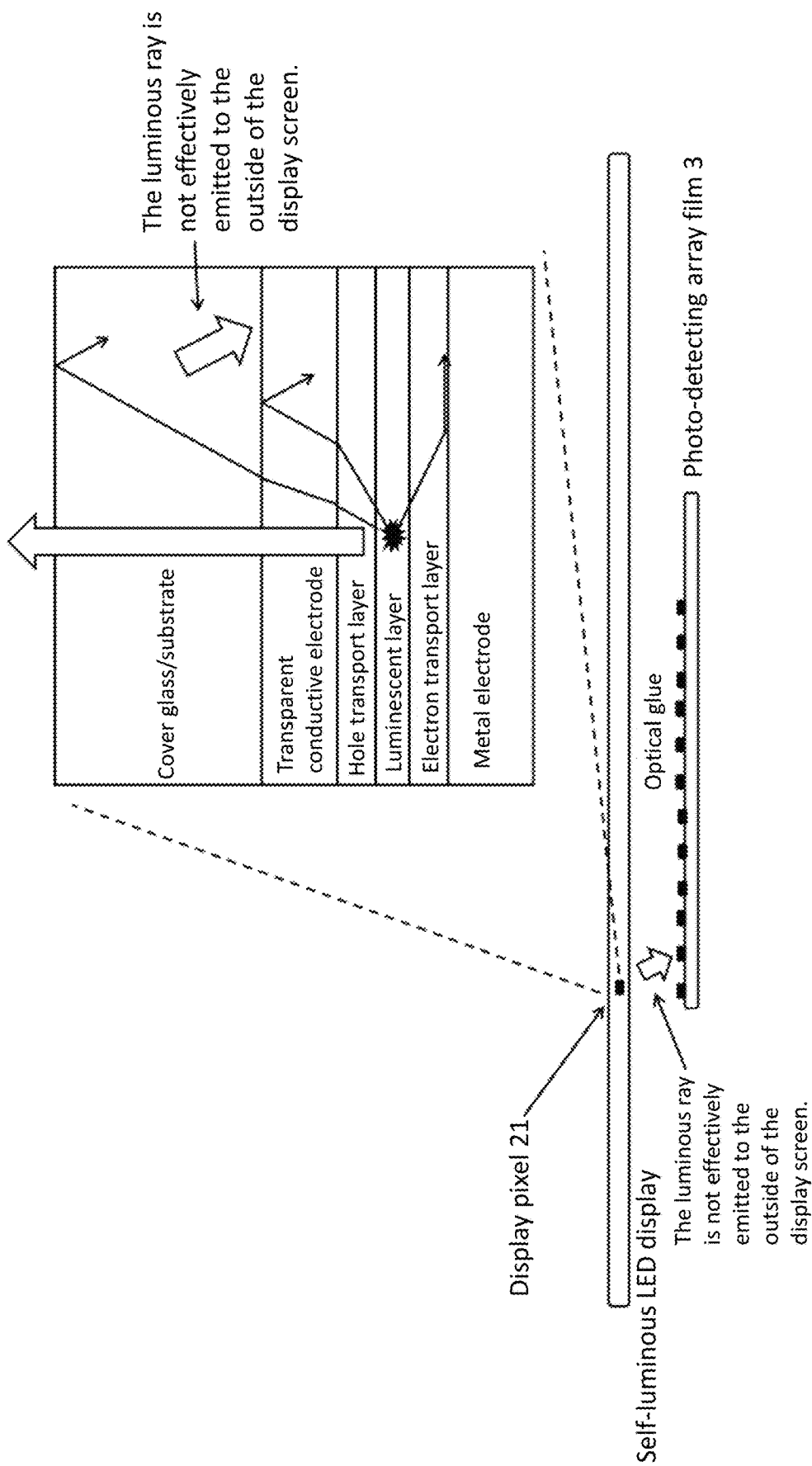
FIG. 14 is a schematic diagram of the luminous intensity of the display pixel detected by the photo-detecting array film of an embodiment of the present disclosure.

The photodiode is integrated in the active matrix of the light-emitting diode TFT. Because the low collimation of the light emitting from the OLED, the light of large-angle emission in the display panel will cause a lot of stray light in the active matrix backplane. It is difficult to accurately determine the luminous intensity of the light-emitting diode of the display pixel. Please refer to FIG. 14. In the present disclosure, by disposing the optical glue below the self-luminous LED display and the photo-detecting array film below the optical glue, an extra photo-detecting array film is used as a sensor device for monitoring the luminous intensity of the display pixel of the self-luminous display screen. The photo-detecting array film can detect the luminous intensity of the pixel by using the light that cannot be effectively emitted outside of the display screen. The light that cannot be effectively emitted outside of the display screen is the lost optical signal mentioned above and it includes the optical signal that reaches the photo-detecting array film through the gap of the metal electrode after reflecting on the surface of the cover glass.

It also includes the optical signal emitted by the luminescent layer and reaching the photo-detecting array film through the gap between the electron transport layer and the metal electrode layer.

The optical glue 4 is configured to change an optical path of the reflected optical signal. The part of reflected optical signal whose incident angle toward the optical glue is greater than the first critical angle is filtered and the reflected optical signal not filtered is formed as the first reflected optical signal. In other words, the reflected light signal whose incident angle is greater than the first critical angle cannot enter the photo-detecting array film because of total reflection, while the reflected light signal whose incident angle is less than the first critical angle can pass through the optical glue and enter the photo-detecting array film. Because the optical path of the reflected optical signal whose incident angle on the optical glue is greater than the first critical angle is too long, the reflected optical signal has become very weak when entering the photo-detecting array film. In order to improve the detection accuracy of the luminous intensity of the display pixel, this part of the reflected optical signal can be filtered by using the optical glue whose refractive index is smaller than that of the cover glass.

The photo-detecting array film 3 is configured to detect the first reflected optical signal. The processing chip is configured to calculate a luminous intensity of the display pixel according to the first reflected optical signal. When it is determined that the luminous intensity of the display pixel is not changed in the preset period, a feedback signal is transmitted from the processing chip. The preset period can be set according to actual needs. For example, the preset time is set to 5 minutes, and every 5 minutes the processing chip compares the detected luminous intensity of the display pixel with the luminous intensity of the display pixel buffered 5 minutes ago. If it is consistent, it is determined that the current display screen likely has "burn-in". The corresponding feedback signal will be transmitted. The feedback signal may be a control signal that controls the circuit of the next layer to deal with the "burn-in". The corresponding feedback signal can also be a prompt message to inform the user that the current display screen has "burn-in".

In order to further improve the accuracy of determining the "burn-in" phenomenon, the processing chip is configured to drive each display pixel sequentially on the display or a display pixel array to emit the optical signal according to a preset timing electrical signal. The processing chip is configured to to transmit the feedback signal when it is determined that the luminous intensity of the display pixel or the display pixel is not changed in the preset period. The display pixel array includes a discrete display pixel array or a continuous display pixel array. The discrete display pixel array refers to a collection of display pixels arranged at intervals, and the continuous display pixel array refers to a collection of display pixels arranged continuously. In contrast to the method of using each display pixel, the detection accuracy of determine whether the current display screen has "burn-in" is effectively improved by determining whether the luminous intensity of the display pixel array (including a plurality of display pixels) is changed in a preset period. In other embodiments, the processing chip is further configured to determine whether the display pixel block has the "burn-in" phenomenon. The processing chip drives all the display pixels in the block to emit light in units of blocks. When it is determined that the number of pixels in a certain block whose luminous intensity is not changed in a preset period is more than the preset number, it is determined that the display screen has "burn-in", and the feedback signal is transmitted from the processing chip. The preset number may be set according to actual needs and is a certain value that is above 80% of the number of display pixels in the block in some embodiment.

Figure 7:
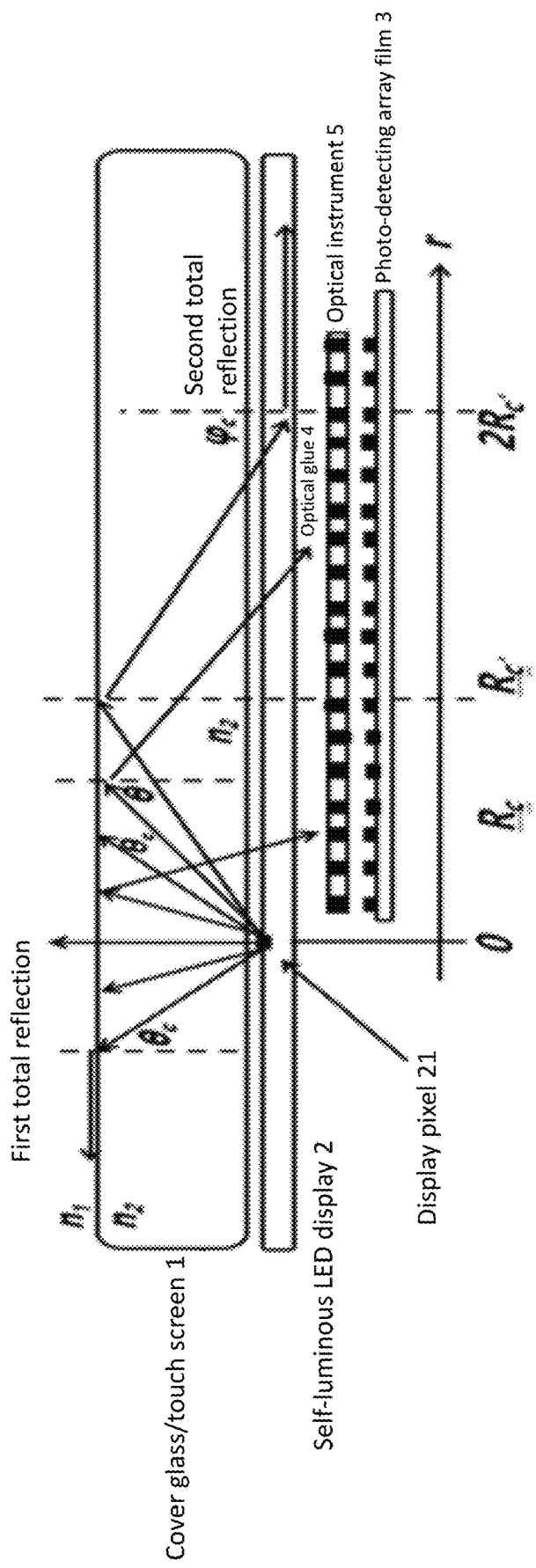
FIG. 7 is a structure schematic diagram of a device for monitoring the luminous intensity of the display pixel of an embodiment of the present disclosure.

In order to better detect the luminous intensity of the display pixel, the device further comprises an optical component 5 as shown in FIG. 7. Please refer to FIG. 7. FIG. 7 is a schematic diagram of a device for monitoring the luminous intensity of the display pixel of an embodiment in the present disclosure. The device can be used not only to monitor the luminous intensity of display pixels, but also to detect and identify physiological feature signal. The physiological feature signal includes a physiological feature signal with uneven texture, such as fingerprints and palm prints. The device includes a cover glass, a touch screen, a self-luminous LED display 2, an optical glue 4, an optical component 5 and a photo-detecting array film 3 from top to bottom.

The touch screen is attached to the lower surface of the cover glass. The optical glue 4 is attached to the lower surface of the self-luminous LED display 2. The refractive index of the optical glue 4 is smaller than the refractive index of the cover glass. The self-luminous LED display includes a plurality of display pixels. The optical component 5 is disposed between the optical glue 4 and the photo-detecting array film 3. The display comprises a plurality of display pixels, the display pixel comprises a luminescent layer, the luminescent layer is configured to emit an optical signal, at least a part of the optical signal is reflected on an upper surface of the cover glass and formed as a reflected optical signal; an the optical glue is configured to filter a part of the reflected optical signal with an incident angle toward the optical glue greater than a first critical angle, so that a remaining part of the reflected optical signal is formed as a first reflected optical signal, an incident angle of the first critical angle toward the optical glue is smaller than the first critical angle, and the first critical angle is a critical angle at which the reflected optical signal is totally reflected on the surface of the optical glue. The optical component 5 is configured to filter a part of the first reflected optical signal so as to form a second reflected optical signal, wherein the part of the first reflected optical signal filtered by the optical component is formed from a part of the optical signal with an incident angle toward the cover glass smaller than a second critical angle, and the second critical angle is a critical angle at which the optical signal is totally reflected on the upper surface of the cover glass. In some embodiments, the optical component 5 is further configured to change an optical path of the first reflected optical signal so as to form the second reflected optical signal which enters the photo-detecting array film 3 at an incident angle smaller than a preset angle. The photo-detecting array film 3 is configured to receive the second reflected optical signal, and the processing chip is configured to calculate the luminous intensity of the display pixel according to the second reflected optical signal. In short, for the optical signal emitted by each display pixel, the most stable and easily detectable part is selected and transmitted to the photo-detecting array film for being detected, improving the luminous intensity and the accuracy of detection effectively.

Figure 2:
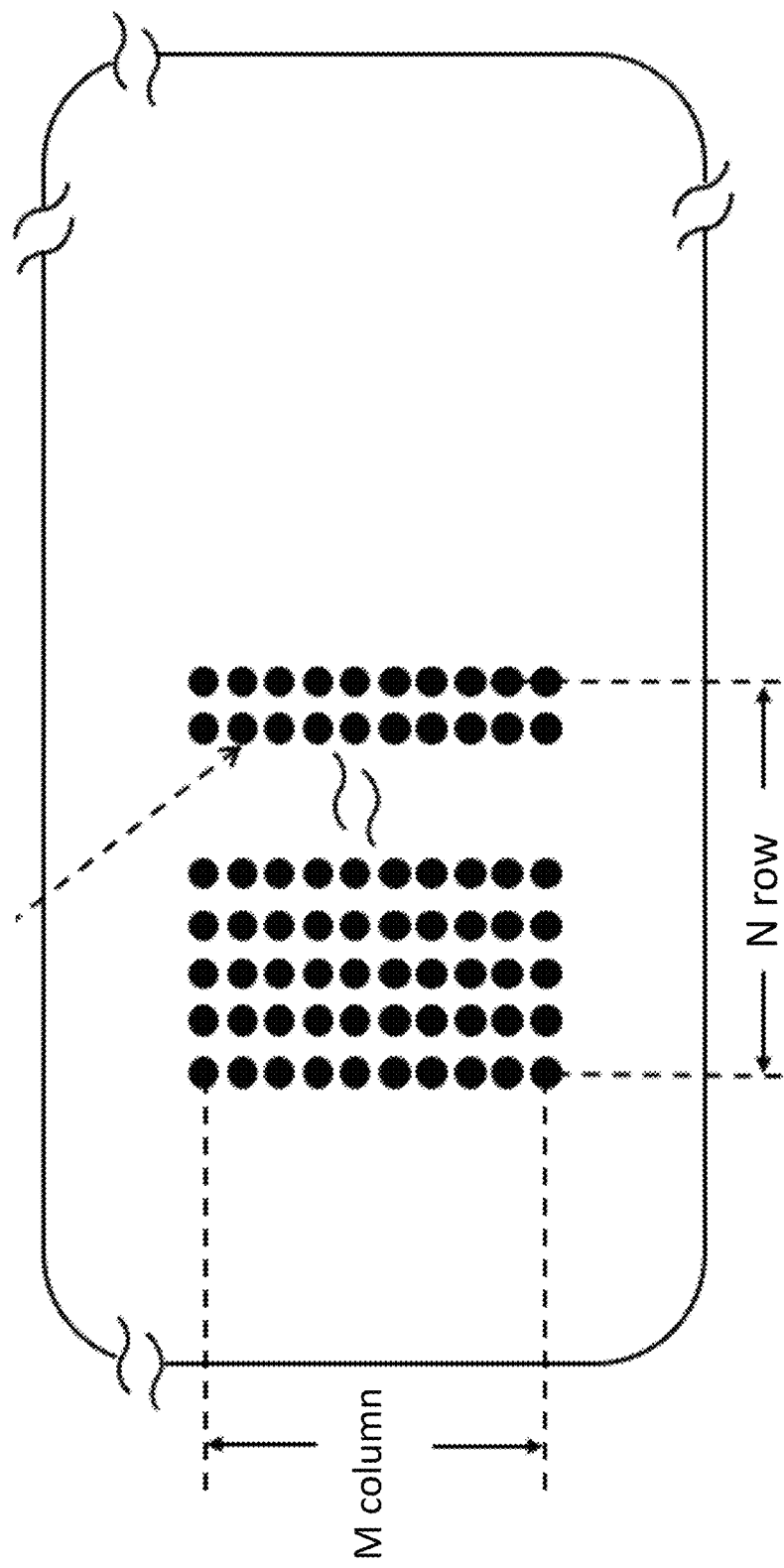
FIG. 2 is a schematic diagram of the display pixel of the self-luminous LED display of an embodiment of the present disclosure.

Please refer to FIG. 2. The display screen is a self-emitting diode display in the present disclosure. As the name implies, it is a display screen composed of a self-luminous diode pixel array, such as an organic light-emitting diode (OLED) display screen and a micro-LED display screen. The display includes M*N display pixels. In order to facilitate the detailed description of the change of the optical path of the optical signal emitted by each display pixel, the display pixel in the N row and the M column on the display screen is denoted as Pmn in the present disclosure, and the changes of the optical path of other display pixels can be understood based on the same reason. In order to better describe the change of the optical path of the display pixel, when the cover glass substrate is disposed above the cover glass/touch screen 1 of the display screen, the thickness of the self-luminous display screen in the present disclosure is less than 1/10 of the thickness of the cover glass, and the refractive index of the display screen is close to the refractive index of the cover glass. Therefore, when the change of the optical path is calculated, the change of the reflected optical signal on the surface of the display screen can be ignored in contrast to that of the cover glass, so as to simplify the description.

Figure 3:
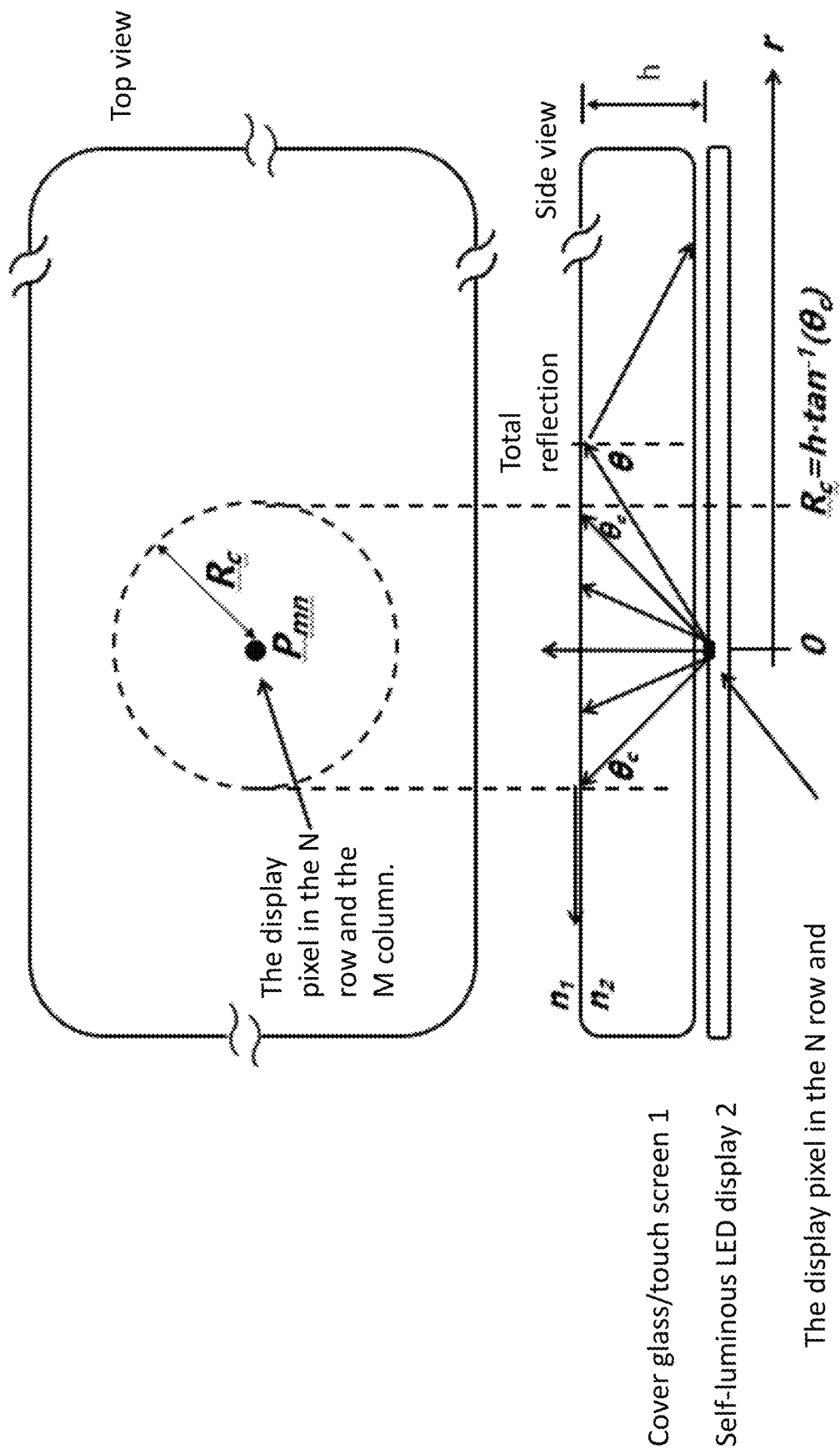
FIG. 3 is a schematic diagram of the optical path change of the display pixel of an embodiment of the present disclosure.

Please refer to FIG. 3. FIG. 3 is a schematic diagram showing the change of optical path from one display pixel of an embodiment in the present disclosure. The upper circle in FIG. 3 represents a top view of a light ray with a cross-sectional radius smaller than Rc from a single display pixel Pmn. The incident angle of the light ray which is corresponding to the radius Rc and incident to the upper surface of the cover glass is θc. For example, the position of circle having the radius Rc is represented as the dotted line in FIG. 3.

The refractive index n2 of the cover glass is about 1.5, and the refractive index n1 of air is about 1.0. Therefore, when the light source of the (m, n)th display pixel illuminates upward with a large angle, the light irradiated onto the cover glass surface with an incident angle θ greater than θc (θc=sin−1(n1/n2)) will be totally reflected. If the projection length of θc corresponding to the r axis of the circular coordinate is Rc, and the position of the (m, n)th light-emitting display pixel Pmn is the origin. The light rays outside the dotted circle having the radius Rc are light rays that are totally reflected on the upper surface of the cover glass. When the incident angle of the light ray on the surface of the cover glass is greater than θc, the optical signal will be totally reflected on the surface of the cover glass and reach and be detected by the photo-detecting array film.

In short, compared to the light rays within the dotted circle in FIG. 3, the light rays whose incident angle on the surface of the cover glass is greater than θc are more suitable in detecting the intensity of the optical signal of the luminescent layer of the display pixel. Therefore, an effective technical solution for monitoring the luminous intensity of display pixels uses Rc as the feature size and uses an effective illumination method to illuminate or scan the cover glass to better detect the optical signal emitted by the display pixels. When the thickness of the cover glass is h, Rc=h·tan(θc).

When a light ray from the light source of the (m, n)th display pixel on the display screen illuminates upward with a large angle, the light ray whose incident angle θ on the upper surface of the cover glass is greater than θc (θc=sin$^{-1}$(n1/n2)) will be totally reflected. However, when the incident angle on the surface of the cover glass becomes large, the light transmission path of the total reflection toward the Photo-detecting array film becomes longer, and the useful optical signal will be attenuated more severely. When this part of the reflected optical signal reaches the light detection array film, it has become a noise having no reference value. Therefore, it is also necessary to define the maximum light detection range corresponding to the (m, n)th display pixel.

Figure 4:
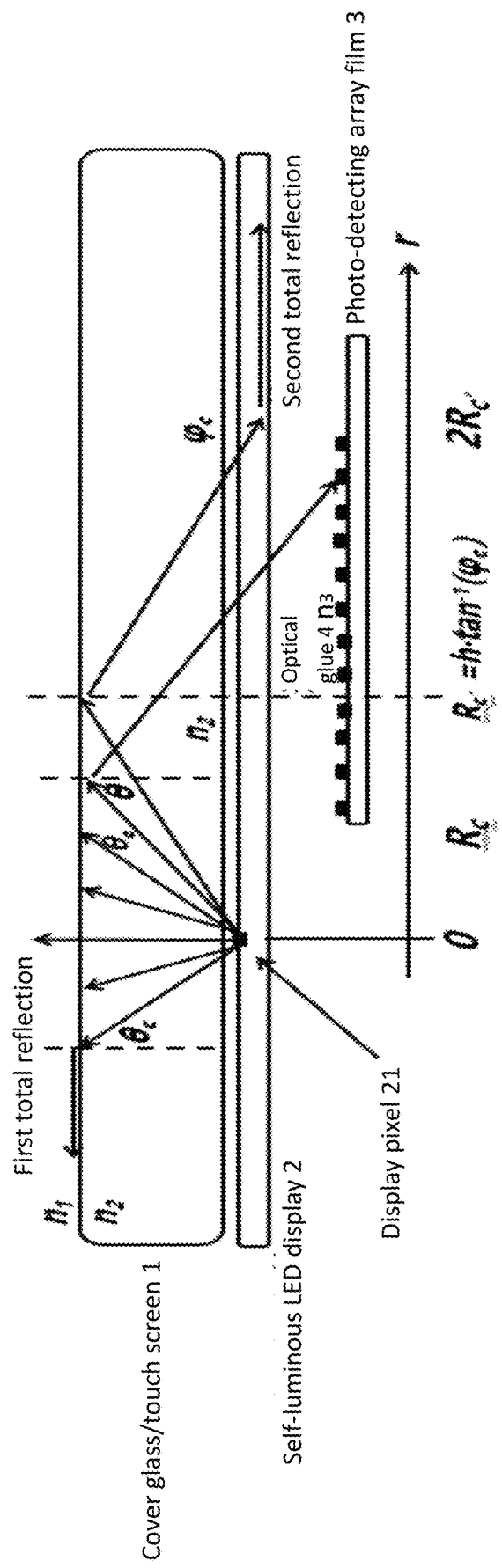
FIG. 4 is a schematic diagram of the optical path change of the display pixel of an embodiment of the present disclosure after disposing the optical glue.
Figure 5:
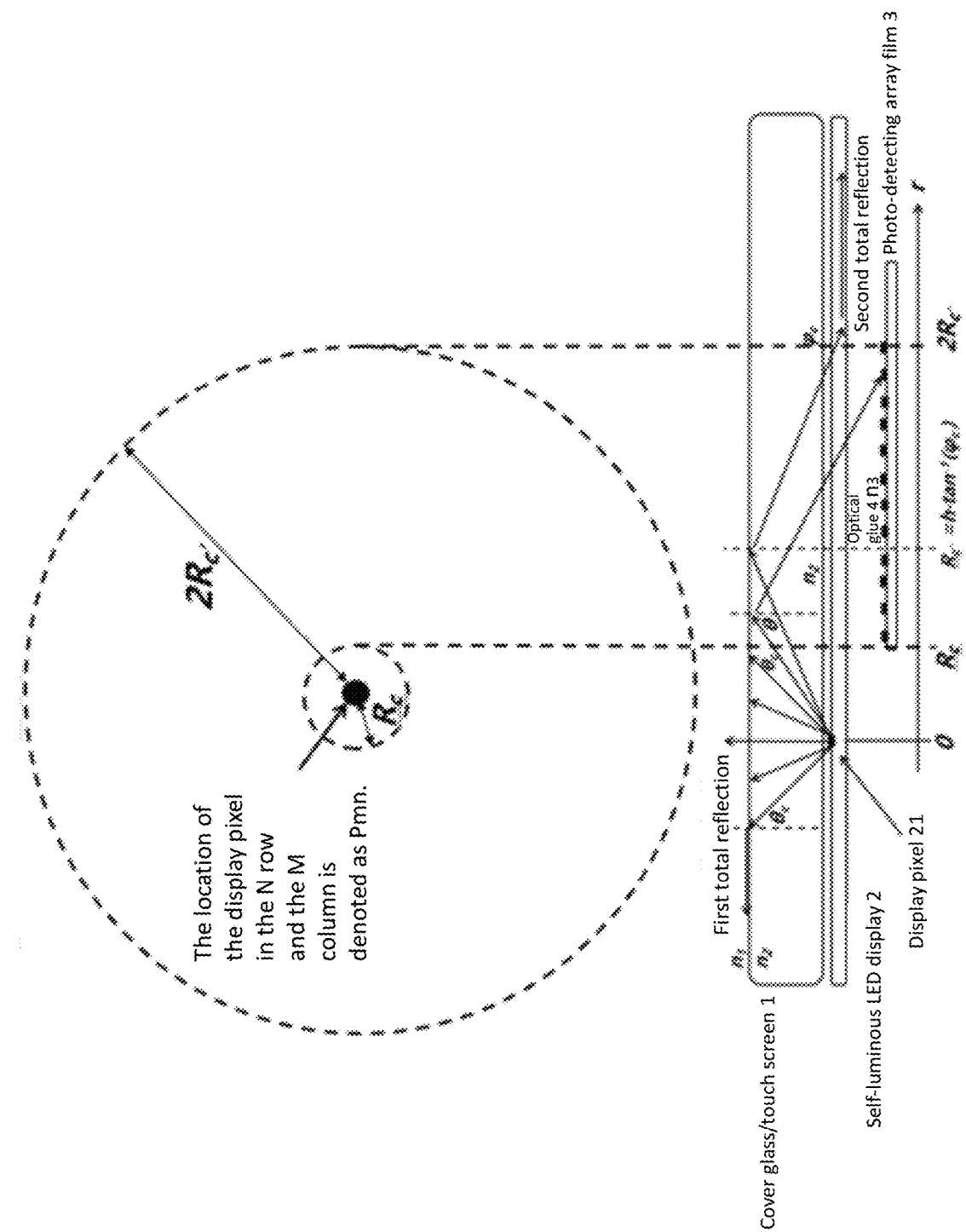
FIG. 5 is a schematic diagram of the optical path change of the display pixel of an embodiment of the present disclosure after disposing the optical glue and the optical component.

Please refer to FIG. 4 and FIG. 5. Because the refractive index (n3) of the optical glue is smaller than the refractive index (n2) of the cover glass, among the light rays of the first total reflection (hereinafter referred to as "total reflection 1", its total reflection critical angle being the second critical angle θc=sin$^{-1}$(n1/n2)) on the upper surface of the cover glass and being incident on the surface of the optical glue, the light rays with an incident angle φ greater than φc will generate a second total reflection on the surface of the optical glue (hereinafter referred to as "total reflection 2", its total reflection critical angle being the first critical angle φc=sin$^{-1}$(n3/n2). If the projection length of φc corresponding to the r axis of the circular coordinate is Rc'=h·tan(φc), the position of the (m, n)th display pixel Pmn is the origin, the light rays outside the dotted circle having the radius 2Rc' are light rays that generate the total reflection 2 on the surface of the optical glue. The light rays that have total reflection 2 on the surface of the optical glue has longer path compared to the light rays within a dotted circle with a radius of 2Rc', and the detection effect of this part of the optical signal is not good. Therefore, the light rays that have total reflection 2 will be filtered by the optical glue with the refractive index n3<n2.

Figure 6:
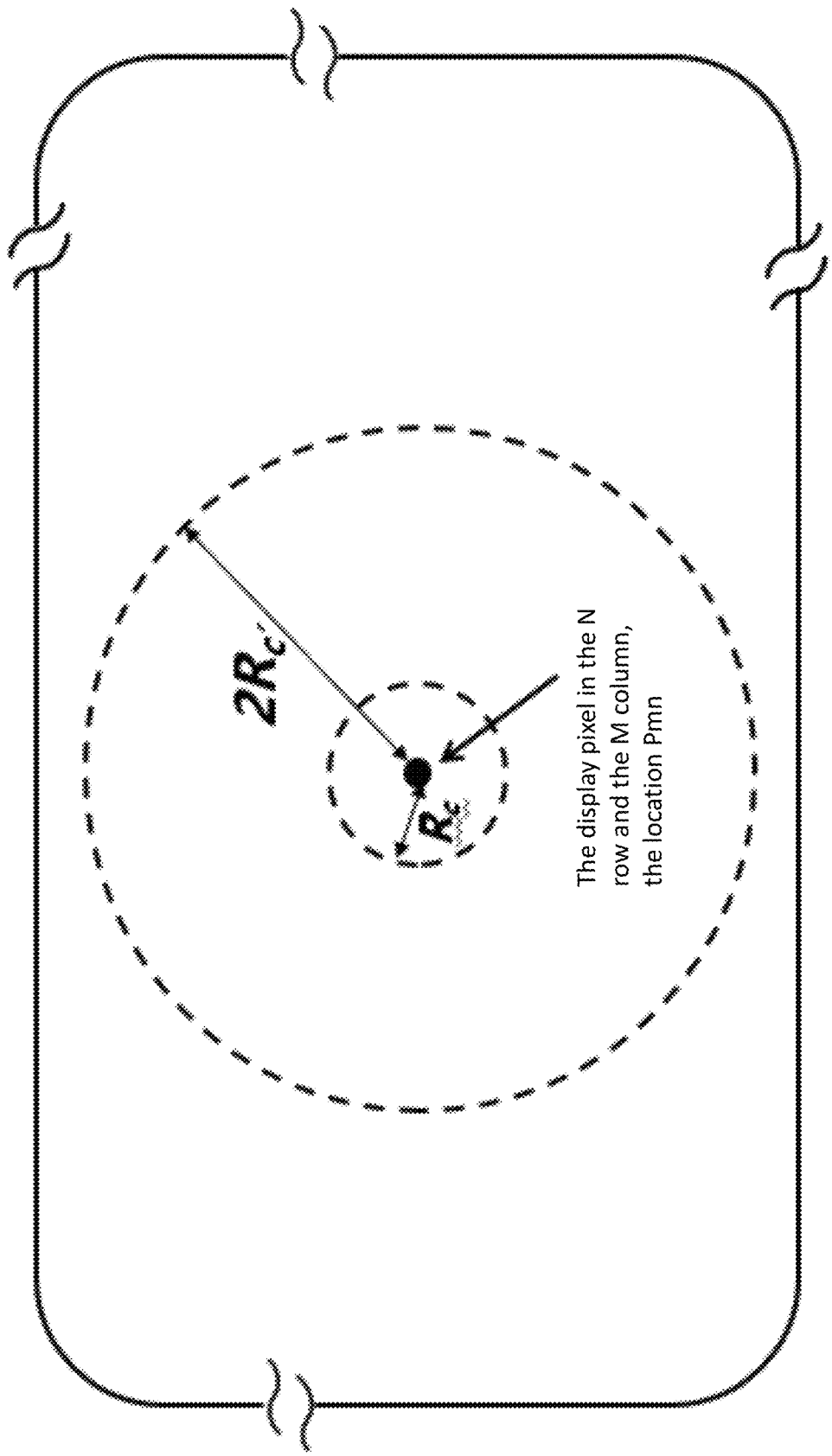
FIG. 6 is a schematic diagram of an effective light emitting area corresponding to the display pixel of an embodiment of the present disclosure.

From FIG. 4 and FIG. 5, the person skilled in the art can understand the light rays from the display pixel having the total reflection 1 but not having the total reflection 2 are relatively stable and easily detectable optical signals. Based on this, the area for detecting the luminous intensity of the display pixel, i.e. the (m, n)th display pixel of the self-luminous display screen used as the light source to illuminate the cover glass, is the area that can be detected by the photo-detecting array film more accurately. The area for detecting the luminous intensity of the display pixels is a dotted concentric ring-shaped area with the (m, n)th display pixel position Pmn as the origin and ranged from Rc to 2Rc'. The area for detecting the luminous intensity of the display pixels is shown in FIG. 6 and ranged from Rc to 2Rc' while projected to the r direction of the circular coordinate, and is also the most suitable area for the single display pixel of the self-luminous LED display.

As mentioned above, the optical glue having the refractive index smaller than that of the cover glass can be used for filtering the light rays outside the area greater than 2Rc'. The light rays outside the area greater than 2Rc' are totally reflected on the surface of the optical glue and not entering the photo-detecting array film, so as to realize the use of the invalid light signal emitted by the display pixel, i.e. the optical signal unable to be transmitted to the outside via the above cover glass substrate. In the present disclosure, by placing the optical component above the photo-detecting array film, the light rays that are smaller than the Rc region is filtered. In the embodiment, the optical component includes a optical shading component and a phase changing optical component. The optical shading component includes a periodical pinhole array or a non-periodical pinhole array. The phase changing optical component includes a photonic crystal structure or a micro-lens array structure whose refractive index changes periodically, or a diffusing-scattering structure whose refractive index changes non-periodically.

In some embodiment, the shape of the pinhole may be a round hole or a square hole. The design of the optical component is based on a compressed sampling method of a coded aperture. By spatial frequency filtering, the coded aperture of the optical component is designed as a device with a light guiding function, so that the reflected optical signal through the optical component can be incident on the photo-detecting array film in the vertical direction as possible (the incident angle is smaller than the preset angle). The reference of the compression sampling method of the coded aperture is as follows: "Coded apertures: past, present, and future application and design," by Stephen R. Gottesman (Proceeding of SPIE, Vol. 6714, 2007). This article uses a simple one-dimensional model to illustrate that the coded aperture can be widely used as a design method for a thin optical component that require high resolution and wide viewing angles. In short, a corresponding optical component according to the predetermined parameter requirements is designed via the compression sampling method of the coded aperture. The specific steps are the conventional technics and will not be repeated here.

In some embodiments, the design of the optical component can also be based on the digital holography. Through the digital holography (or computer-generated holography), the corresponding optical component can be designed according to the predetermined parameter requirements. The specific steps can refer to the following document: M. A. Seldowitz, J. P. Allebach, and D. W. Sweeney, "Synthesis of digital holograms by direct binary search," Appl. Opt. 26, 2788-2798 (1987). The document discloses that a computer is used to design the corresponding digital holography optical component via a specific algorithm, thereby achieving an output image with high resolution.

Figure 8:
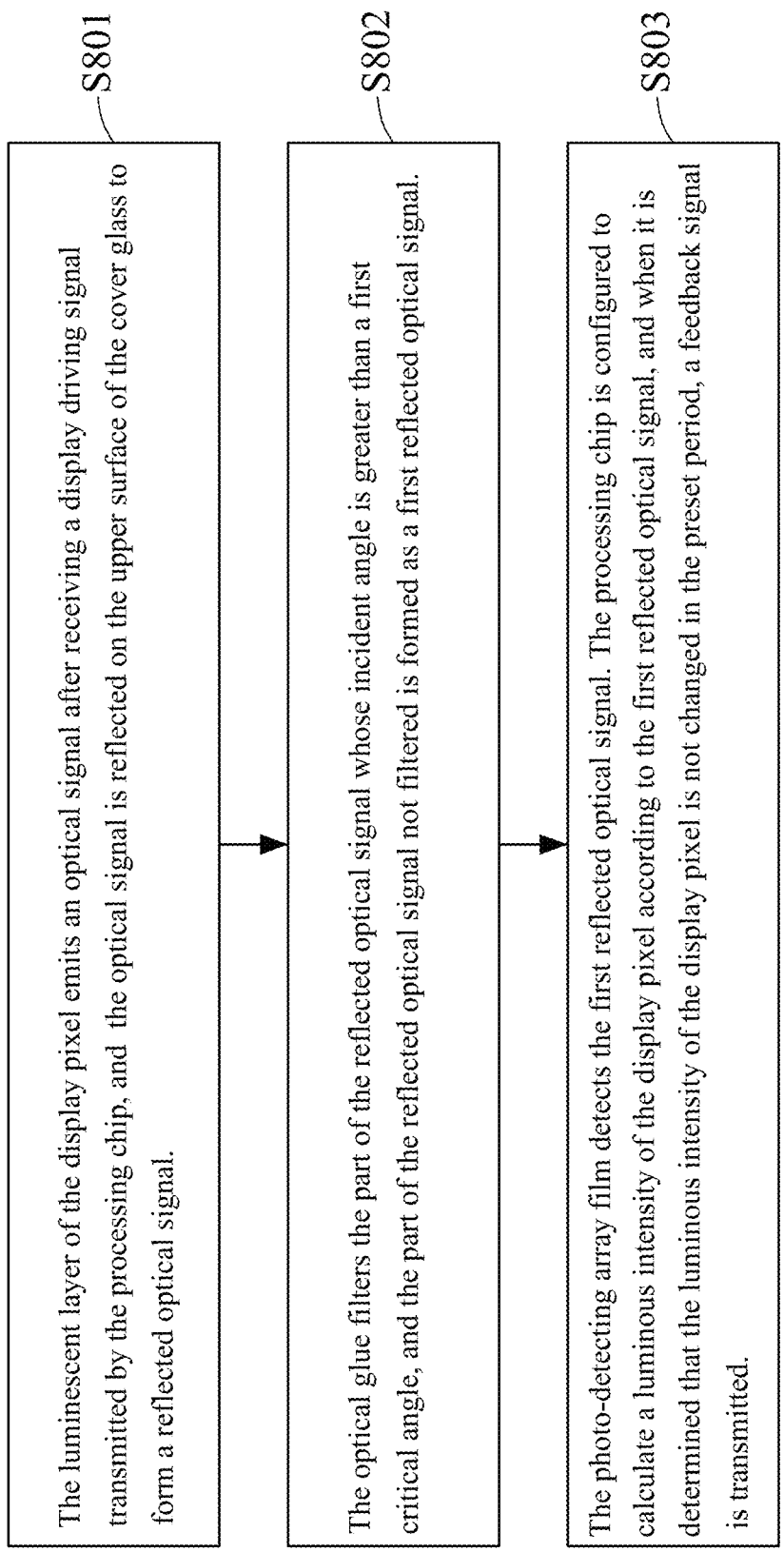
FIG. 8 is a flowchart of a method for monitoring the luminous intensity of the display pixel of an embodiment of the present disclosure.

Please refer to FIG. 8. A method for monitoring the luminous intensity of the display pixel is provided in the present disclosure. The method is used to a device for monitoring luminous intensity of display pixel. The device includes a self-luminous LED display, an optical glue, a photo-detecting array film and a processing chip. The optical glue is attached to a lower surface of the self-luminous LED display. The photo-detecting array film is disposed under the optical glue. The self-luminous LED display includes a plurality of display pixels. Each display pixel includes a luminescent layer. A cover glass is disposed above the display pixels. The refractive index of the optical glue is smaller than the refractive index of the cover glass. The method includes the following steps.

In a step S801, the luminescent layer of the display pixel emits an optical signal after receiving a display driving signal transmitted from the processing chip. The part of optical signal is reflected on the upper surface of the cover glass to form a reflected optical signal. Because the display screen and the cover glass both have a certain degree of transmittance, the optical signal emitted by the display pixel will not only be reflected on but also transmit through the upper surface of the cover glass. In other words, some part of the optical signal directly enters the air through the upper surface of the cover glass, and only the part of the optical signal reflected on the upper surface of the cover glass will finally enter the photo-detecting array film. Therefore, the present disclosure is about filtering and processing the reflected optical signal furthermore.

In a step S802, the optical glue filters the part of the reflected optical signal whose incident angle is greater than a first critical angle, and the part of the reflected optical signal not filtered is formed as a first reflected optical signal. The first critical angle is the critical angle at which the reflected optical signal is totally reflected on the surface of the optical glue. In short, the part of the optical signal having long paths, i.e. the light rays in the region r>2Rc', are filtered by the optical glue having the refractive index smaller than that of the cover glass of the display.

In a step S803, the photo-detecting array film detects the first reflected optical signal. The processing chip is configured to calculate a luminous intensity of the display pixel according to the first reflected optical signal. When it is determined that the luminous intensity of the display pixel is not changed in the preset period, a feedback signal is transmitted.

In some embodiment, the step "it is determined that the luminous intensity of the display pixel is not changed in a preset period" includes determining whether the luminous intensity of the display pixel reaches the preset display light intensity. If the luminous intensity of the display pixel does not reach the preset display light intensity, it means that the display pixel of the display screen has the "burn-in" phenomenon because of long-term use. The device further includes a display driving adjustment circuit. The feedback signal is a driving adjustment signal transmitted from the processing chip to the display driving adjustment circuit. After the display driving adjustment circuit receives the driving adjustment signal, the display driving adjustment circuit will automatically close the loop to adjust the drive current or drive voltage of the display pixel that do not meet the standard, so that the luminous intensity of the display pixel reaches the preset display light intensity.

In some embodiment, the display screen includes M*N display pixels. The method includes that the processing chip is configured to drive each display pixel sequentially on the display screen or a display pixel array to emit the optical signal according to a preset timing electrical signal to form a reflected optical signal. For example, the first row of the display pixels on the display screen is $P_{11}, P_{12} \ldots P_{1N}$, the second row is $P_{21}, P_{22} \ldots P_{2N}$, and so on, and the N row is $P_{M1}, P_{M2} \ldots P_{MN}$. According to a preset timing electrical signal, the processing chip can drive the display pixels on the display screen row by row, column by column, or drive discrete display pixels that change periodically (For example, drive the first row $P_{11}, P_{13}, P_{15}$, then start the second row $P_{21}, P_{23}, P_{25}$, and then drive the third row $P_{31}, P_{33}, P_{35}$, and so on). Of course, it is also possible to sequentially drive a plurality of display pixels arranged non-periodically. In short, the order of driving each display pixel on the display screen to emit light can be selected according to actual needs.

In some embodiment, the photo-detecting array film includes P*Q pixel detection areas. Each pixel detection area is corresponding to a pixel detection structure. Each pixel detection structure includes a pixel thin film circuit composed of at least one thin film transistor and a light detection unit. The light detection unit includes a photodiode or a phototransistor. For each light detection unit, there are some implementation methods:

First Embodiment

The TFT image sensing array film (i.e., the photo-detecting array film) is an array formed by the photodiodes. The array formed by the photodiodes includes a photodiode sensing area. The existing liquid crystal display (LCD) panels or organic light-emitting diode (OLED) display panels are driven by a TFT structure to scan a single pixel to achieve the display function of the pixel array on the panel. The main structure for forming the TFT switching function is a semiconductor field effect transistor (FET), and the well-known semiconductor layer is mainly made of amorphous silicon, polycrystalline silicon, indium gallium zinc oxide (IGZO), or an organic compound mixed with carbon nano materials. The structure of a photo-detecting diode may also be ready by such semiconductor materials and the production equipment is also compatible with the production equipment of the TFT array, so the TFT photodiode (i.e., photodiode) has started to be produced by a TFT array preparation method in recent years. The specific structure of an existing photodiode can refer to the structure of the photo-detecting array film described in U.S. Pat. No. 6,943, 070B2 and the patent CN 204808361U of the People's Republic of China. The difference between the production process of the TFT image sensing array film and the TFT structure of the display panel is the originally pixel opening area of the display panel is changed to the light sensing area in the production process. The thin glass can be used as the base material in the TFT preparation method. In addition, the high temperature resistant plastic material can also be used as the base material, as described in U.S. Pat. No. 6,943, 070B2.

Figure 9:
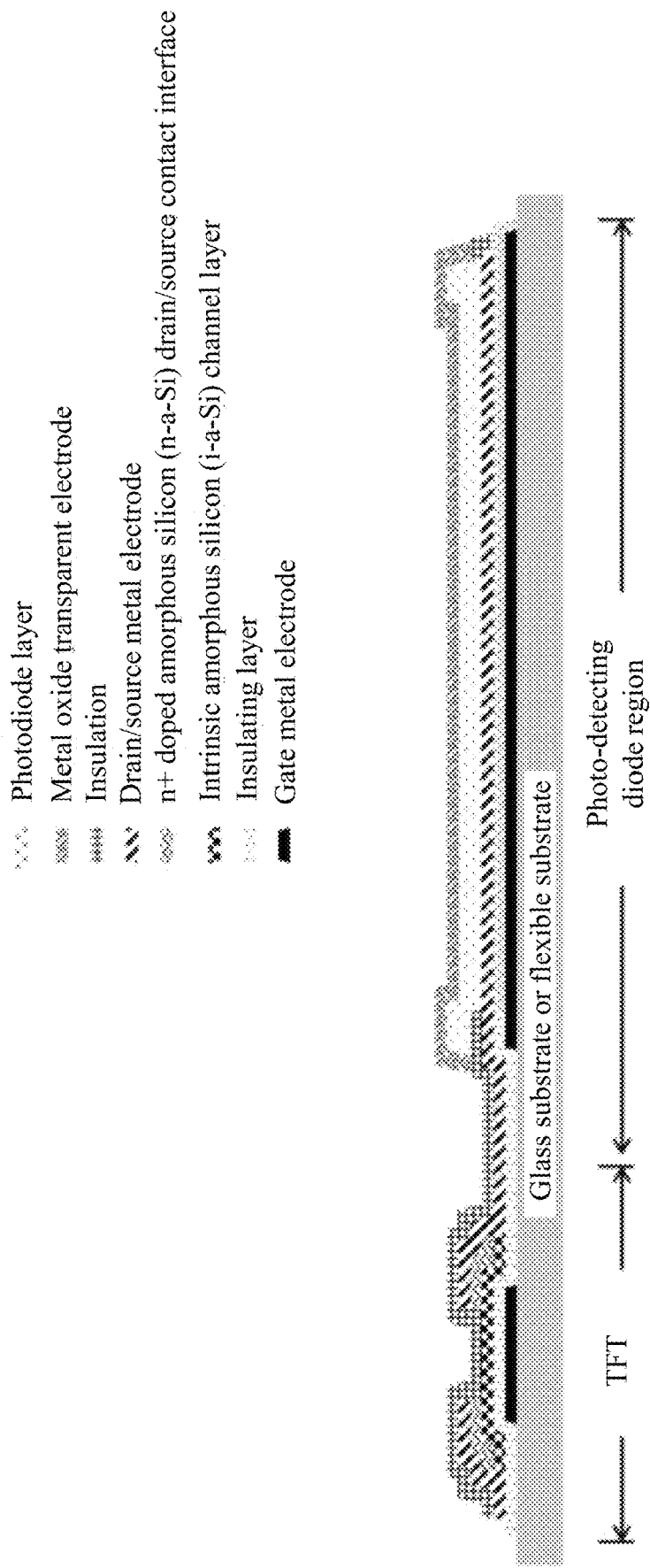
FIG. 9 is a structure schematic diagram of the light detection unit of an embodiment of the present disclosure.

The existing TFT image sensing array film is susceptible to factors such as the surrounding ambient light or visible light reflection and refraction from the display pixels so it would cause optical interference and severely affecting the signal to noise ratio (SNR) of the TFT image sensing array film embedded under the display panel in order to improve the SNR. In FIG. 9, the light detection unit of the present disclosure is further improved. Thus, the improved TFT image sensing array film can detect and identify the infrared signal reflected by the user's body part. The specific structure is as follows:

The photodiode layer includes a p-type semiconductor layer, a i-type semiconductor layer and a n-type semiconductor layer. The p-type semiconductor layer, i-type semiconductor layer, and n-type semiconductor layer are stacked from top to bottom. The i-type semiconductor layer is a microcrystalline silicon structure or an amorphous germanium silicide structure. The microcrystalline silicon structure is a semiconductor layer formed by silane and hydrogen via chemical vapor deposition. The microcrystalline silicon structure is a semiconductor layer formed by silane and hydrogen via chemical vapor deposition, the crystallinity of the microcrystalline silicon structure is higher than 40%, and the band gap of the microcrystalline silicon structure is less than 1.7 eV. The amorphous germanium silicide structure is an amorphous semiconductor layer formed by silane, hydrogen, and germane via chemical vapor deposition; the band gap of the amorphous semiconductor layer is less than 1.7 eV.

The band gap is a width of forbidden band (unit is electron volts (eV)). The energy of electrons in solids cannot be continuously measured, because they are discontinuous energy bands. To conduct electricity, free electrons must be existed. The energy band which has free electron is called the conduction band (which can conduct electricity). To become a free electron, a bound electron must collect sufficient energy to transition from the valence band to the conduction band. The minimum value of energy of transition is the band gap. The band gap is an important characteristic parameter of semiconductors. It's the value is mainly determined by the energy band structure of the semiconductor. It is related to the crystal structure and the bonding properties of atoms.

At room temperature (300K), the band gap of germanium is about 0.66 ev. Germanium is contained in silane. The band gap of i-type semiconductor layer will be reduced after doped with germanium. When the band gap is less than 1.7 eV, it means that the i-type semiconductor layer can receive optical signals in a wavelength range from visible spectrum or infrared spectrum (or near-infrared light). The operating wavelength range of photodiodes containing amorphous or microcrystalline germanium silicide structures can be extended to the range of light wavelengths from 600 nm to 2000 nm via adjusting the GeH4 concentration of chemical meteorological deposits.

Second Embodiment

Based on the first embodiment, in order to improve the quantum efficiency of photoelectric conversion, the amorphous silicon photodiode can also be formed by stacking p-type/i-type/n-type structures with a double junction or more. The p-type/i-type/n-type material of the first junction layer of the photodiode is still an amorphous silicon structure. The p-type/i-type/n-type material above the second junction layer may be a microcrystalline structure, a polycrystalline structure, or doped with compound materials that can extend the photosensitive wavelength range. In short, multiple groups of p-type/i-type/n-type structures can be stacked on top of each other to form a photodiode structure to achieve a photodiode structure. For each p-type/i-type/n-type structure, the photodiode structure described in the first embodiment is used.

Third Embodiment

Based on the first embodiment or second embodiment, for each p-type/i-type/n-type structure, the p-type semiconductor layer may be a multilayer structure with more than two layers. For example, the p-type semiconductor layer is a three-layer structure which includes a first p-type semiconductor layer (p1 layer), a second p-type semiconductor layer (p2 layer), and a third p-type semiconductor layer (p3 layer) from top to bottom. The p1 layer can adopt an amorphous structure and be heavily doped with boron (the boron concentration is more than twice that of the standard process). The p2 and p3 adopt a microcrystalline structure and are normally doped with boron (doped in accordance with the standard process concentration). The absorption of light can be reduced by the thinner p2 and p3 layers, so that light enters the i-layer as much as possible and is absorbed by the i layer to improve photoelectric conversion rate. On the other hand, the p2 layer and the p3 layer are normally doped with boron, which can effectively prevent the built-in potential from being deteriorated due to the heavy doping of p1 layer. When the p-type semiconductor layer includes a multi-layer structures having other numbers of layer, the structure is similar as other layer, and the details are not described again.

Similarly, the n-type semiconductor layer may have a multilayer structure with more than two layers. For example, the n-type semiconductor layer is a three-layer structure which includes a first n-type semiconductor layer (n1 layer), a second n-type semiconductor layer (n2 layer), and a third n-type semiconductor layer (n3 layer) from top to bottom. The n3 layer can adopt an amorphous structure and be heavily doped with phosphorus (the phosphorus content is more than twice that of the standard process). The n1 and the n2 adopt microcrystalline structure and are normally doped with phosphorus (according to standard production process). The absorption of light can be reduced by the thinner p2 and p3 layers, so that light enters the i-layer as much as possible and is absorbed by the i-layer to improve photoelectric conversion rate. On the other hand, the normal phosphorus doping of the n1 layer and the n2 layer can effectively prevent the built-in potential from being deteriorated due to the heavy doping of the n3 layer. When the n-type semiconductor layer includes a multi-layer structure having other numbers of layer, the structure is similar as other layers, and the details are not described again.

Fourth Embodiment

Figure 10:
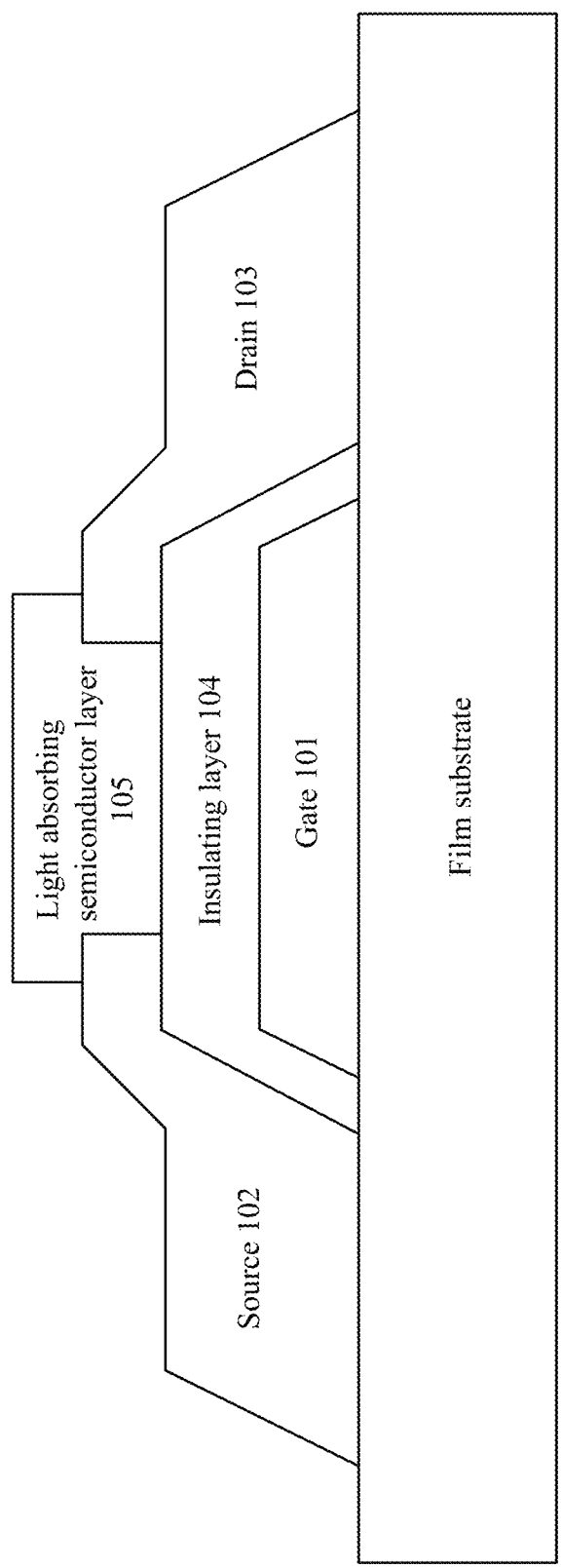
FIG. 10 is a structure schematic diagram of the light detection unit of another embodiment of the present disclosure.

The TFT image sensing array film (i.e., the photo-detecting array film) is an array formed by the phototransistors. The array formed by the phototransistor includes a phototransistor sensing area. A photosensitive film transistor is disposed on the phototransistor sensing area. In FIG. 10, the photosensitive film transistor includes a gate 101, a source 102, a drain 103, an insulating layer 104 and a light absorbing semiconductor layer 105. The photosensitive film transistor is an inverted coplanar structure. The inverted coplanar structure includes the gate 101, the insulating layer 1044 and the source 102 vertically arranged from bottom to top. The drain electrode 103 and the source electrode 102 are laterally coplanar. The insulating layer 104 includes the gate 101 so that there is no contact between the gate 101 and the source 102, the gate 101 and the drain 103. The source 102 and the drain 103 are isolated by the gap. A photosensitive leakage current channel is formed between source 102 and drain 103 laterally. The light absorbing semiconductor layer 105 is disposed in the photosensitive leakage current channel.

Generally, no current will flow between the source and the drain when the TFT is controlled by the gate voltage to operate in the off state. However, the electron-hole pair is excited by the energy of the light in the semiconductor when the TFT is irradiated by a light source. The field effect of the TFT structure will cause the electron-hole pair separation, so that a photosensitive leakage current is generated on the TFT. This photosensitive leakage current characteristic allows the TFT array to be applied to light detection or light detection technology. Compared with a general device that uses TFT leakage current as a photosensitive film transistor, is a light absorbing semiconductor layer on the uppermost light absorbing layer by the inverted coplanar field effect transistor structure in the present disclosure. That greatly increases the excitation of photoelectrons and improves the photoelectric conversion efficiency.

Figure 12:
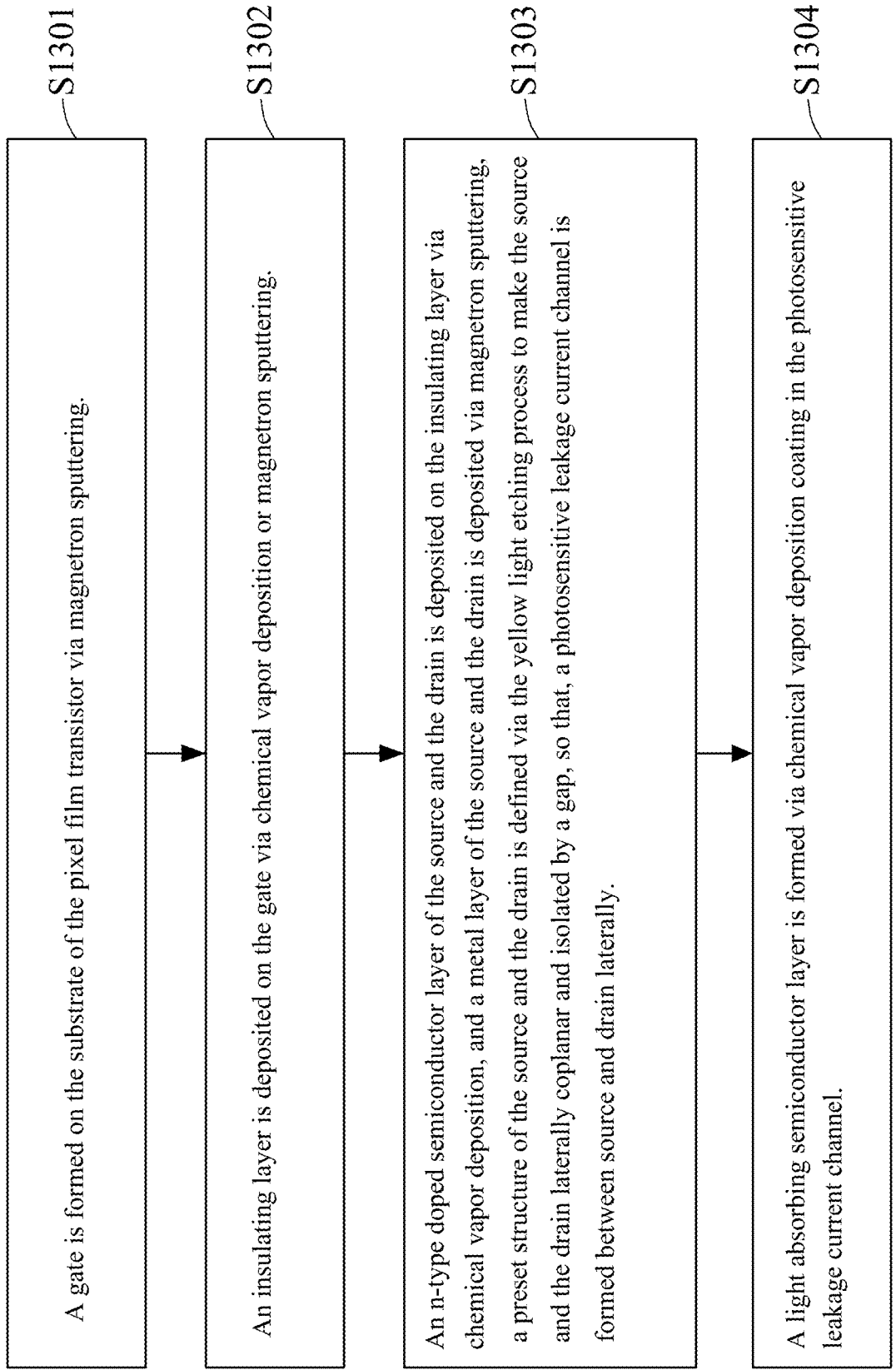
FIG. 12 is a preparation flow chart of the light detection unit of another embodiment of the present disclosure.

As shown in FIG. 12, it is a flowchart of an embodiment of a method for preparing light detection film of the present disclosure. The method is configured to prepare a photosensitive film transistor (i.e., the light detection unit) of the sixth embodiment and includes the following steps:

In a step S1301, a gate is formed on the substrate of the pixel film transistor via magnetron sputtering. The substrate of the pixel film transistor can be a rigid board or a flexible material (e.g., polyimide).

In a step S1302, an insulating layer is deposited on the gate via chemical vapor deposition or magnetron sputtering.

In a step S1303, an n-type doped semiconductor layer of the source and the drain is deposited on the insulating layer via chemical vapor deposition, and a metal layer of the source and the drain is deposited via magnetron sputtering, a preset structure of the source and the drain is defined via the yellow light etching process to make the source and the drain laterally coplanar and isolated by a gap, so that, a photosensitive leakage current channel is formed between source and drain laterally.

In a step S1304, a light absorbing semiconductor layer is formed via chemical vapor deposition coating in the photosensitive leakage current channel.

Fifth Embodiment in terms of the familiar field effect transistor structure, the TFTs as scan drive and data transfer switches do not need to be designed specifically for the structure that captures photocurrent between the source and drain. However, in the application of field effect transistor in the detection of photosensitive leakage current, if the electron-hole pair excited by light is separated by field effect, the drift path driven by the electric field is too long, it is very likely that the photoelectrons will recombine with the holes or trapped by the dangling bond defect of the light absorbing semiconductor layer itself before they successfully reach the electrode. Thus, photocurrent output cannot be effectively used for photodetection. In order to improve the photosensitive leakage current affected by the channel length between the source and the drain, so as to increase the area of the light-absorbing semiconductor without deteriorating the photoelectric conversion efficiency. In this embodiment, the source and the drain of the fourth embodiment are further improved, and a new structure of the source and the drain is proposed.

Figure 11:
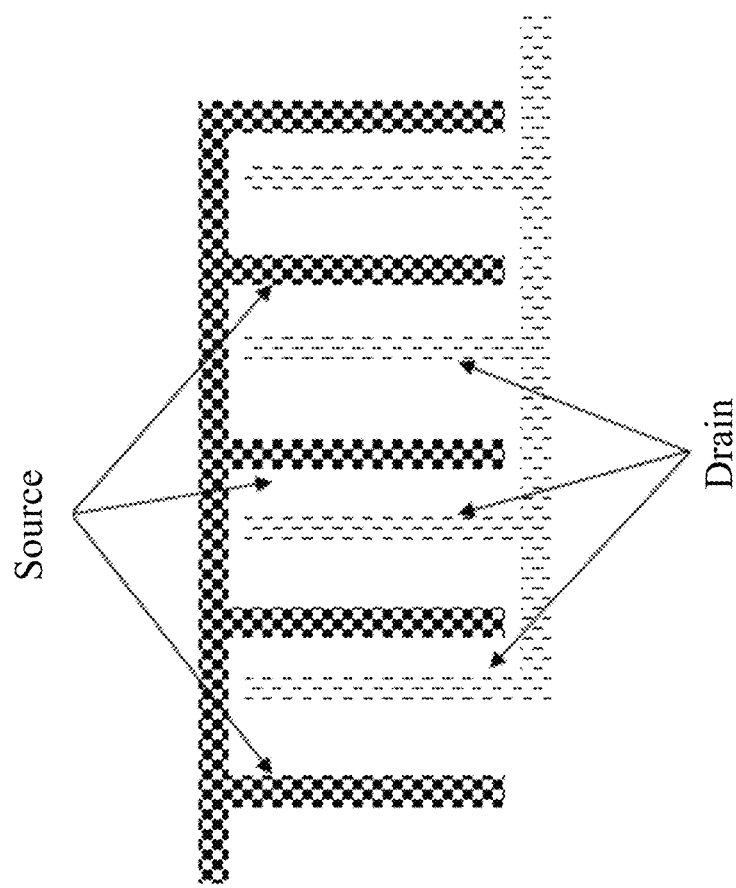
FIG. 11 is a structure schematic diagram of the source and the drain of another embodiment of the present disclosure.

In FIG. 11, the number of the source and drain are multiple. The sources are connected in parallel with each other, and the drain are connected in parallel with each other. The source and the drain are isolated by a gap. The photosensitive leakage current channel is formed between the source and drain laterally. The photosensitive leakage current channel includes a first gap formed between adjacent sources, a drain is placed in the first gap and a second gap formed between adjacent drains. The source and drain are arranged alternatively and isolated by a gap. The distance between each source and the adjacent drain is less than the electron drift distance. The electron drift distance is a distance that an electron can survive under a field effect. In this way, in each detection pixel, multiple sources belonging to the same pixel are connected in parallel to each other, and multiple drains belonging to the same pixel are also connected in parallel to each other. It can effectively reduce the probability of photo-excited electrons and holes recombining. The probability of the photoelectron captured by the electrode under the field effect is improved, and the photosensitivity of the TFT leakage current photosensitive film transistor is improved maximumly.

In order to gradually prepare the process of the photosensitive film transistor (i.e., the light detection unit) of the fifth embodiment, the general steps are similar to the photosensitive film transistor of the fourth embodiment. The difference is that the "Define a preset structure of the source and drain via the yellow light etching process to capture source and drain laterally coplanar and isolated by a gap" of the step S1303 includes a source group and a drain group are defined by a yellow light etching process when the source and the drain are prepared. Each source group includes multiple sources connected in parallel with each other. A first gap is formed between adjacent sources, a drain is placed in the first gap. A second gap is formed between adjacent drains, and a source is disposed in the second gap. The source and the drain are arranged alternatively and isolated by a gap.

In some embodiment, the photo-detecting array film is configured to receive the detection trigger signal and is in a light detection status. The photo-detecting array film also receives the optical signals reflected from a user's body part (e.g., fingerprints, eyeballs, irises) to capture the user's body part information. The photo-detecting array film is configured to receive the light source trigger signal, in the state of emitting light sources (e.g., infrared light sources). In some embodiment, the light source trigger signal and the detection trigger signal alternately switches at a preset frequency and meet the preset frequency. Taking the array formed by the photo-detecting array film as a photodiode as an example, in the actual application process, the TFT can be used as a scanning to drive a bias voltage (including a forward bias voltage, a zero bias voltage or a negative bias voltage) between the p-type/i-type/n-type photodiode, so that function of TFT image sensing array film emitting infrared light can be achieved.

Specifically, a forward bias a zero bias or a negative bias may be applied between the p-type/i-type/n-type infrared photodiodes alternately to trigger the first trigger signal or the second trigger signal. Taking an array formed by infrared photodiodes with 10 pixel dots as an example, a forward bias is applied to the p-type/i-type/n-type infrared photodiodes during the first period, so that the 10-pixel pixel arrays are all emitting infrared light state. A zero or negative bias is applied to the p-type/i-type/n-type infrared photodiodes in the second period, so that the 10-pixel array is in the infrared light detection state, which is configured to capture the infrared light reflected by the user's eye information and generate corresponding infrared image output. In the third period, a forward bias is applied to the p-type/i-type/n-type infrared photodiodes, so that the 10-pixel pixel arrays are all in the state of emitting infrared light, alternating alternately, and so on. Further, the light source trigger signal (i.e., the first trigger signal) and the detection trigger signal (i.e., the second trigger signal) are alternately switched, and the switching frequency conforms to a preset frequency. The time interval between adjacent periods can be set according to actual needs. In some embodiment, the time interval can be set to the time required for the infrared photodiode array to receive at least one complete image signal when the TFT array drives and scans each frame, that is, the preset frequency is switched once after the above time interval has passed.

In some embodiment, a light detection sensing area is disposed on the display unit. The light detection sensing area includes a plurality of light detection sensing sub-regions. One of the photo-detecting array films is correspondingly disposed under each light detection sensing sub-region. The device further includes a storage medium that stores a computer program. Taking fingerprint recognition as an example, when the computer program is executed by the processor, the following steps are realized: a start command is received for the fingerprint recognition sub-region (i.e., the light detection sensor sub-region), and the detection control circuit turns on the fingerprint recognition sub-region (i.e., the light detection sensor sub-region) the photo-detecting array film below; or, upon receiving the close command to the fingerprint recognition sub-region, the detection control circuit turns on the photo-detecting array film below the fingerprint recognition sub-region.

Taking the number of fingerprint recognition sub-regions as two as an example, the two fingerprint recognition sub-area can be evenly distributed on the screen one by one or one left or right, or they can be distributed on the screen in other arrangements. The application process of a terminal with two fingerprint recognition sub-regions is specifically described below: a user-initiated activation signal is received during using, and the light detection devices (i.e., the sensing unit) under the two fingerprint recognition sub sub-area are set to the on state. In some embodiment, the range formed by the two-fingerprint recognition sub-areas covers the entire display screen. It can ensure that when the light detection devices under the two-fingerprint recognition sub-areas are set to the on state. The light signal can be absorbed by the TFT image sensing array film (i.e., the sensing unit) below to capture the user's fingerprint or body information. Of course, according to the user's preferences, the user can turn on the light detection device under a certain fingerprint recognition sub-region and turn off the light detection device under another fingerprint recognition sub-region.

Although the above embodiments have been described, those skilled in the art can make other changes and modifications to these embodiments once they have learned the basic inventive concept. Therefore, the above descriptions are only the embodiments of the present disclosure and does not limit the patent protective scope of the present disclosure. Similarly, any equivalent structure or equivalent process transformation made by using the present specification and the drawings, or directly or indirectly applied to other relevant technical fields, shall be included in the patent protective scope of the present disclosure.

I claim:

1. A device for monitoring luminous intensity of display pixel comprising a display, a cover glass disposed above the display, an optical glue attached to the lower surface of the display, an optical component, a photo-detecting array disposed under the optical glue and a processing chip; wherein
    the display comprises a plurality of display pixels, the display pixel comprises a luminescent layer, the luminescent layer is configured to emit an optical signal, at least a part of the optical signal is reflected on an upper surface of the cover glass and formed as a reflected optical signal; and
    the optical glue is configured to filter a part of the reflected optical signal with an incident angle toward the optical glue greater than a first critical angle, so that a remaining part of the reflected optical signal is formed as a first reflected optical signal, the incident angle toward the optical glue is smaller than the first critical angle, and the first critical angle is a critical angle at which the reflected optical signal is totally reflected on the surface of the optical glue;
    the optical component is disposed between the optical glue and the photo-detecting array and configured to filter a part of the first reflected optical signal so as to form a second reflected optical signal, wherein the part of the first reflected optical signal filtered by the optical component is formed from a part of the optical signal with an incident angle toward the cover glass smaller than a second critical angle, and the second critical angle is a critical angle at which the optical signal is totally reflected on the upper surface of the cover glass;
    the photo-detecting array is configured to receive the second reflected optical signal, and the processing chip is configured to calculate a luminous intensity of the display pixel according to the second reflected optical signal received by the photo-detecting array.

2. The device for monitoring luminous intensity of display pixel according to claim 1, wherein the processing chip is configured to drive each display pixel or a display pixel array on the display to emit the optical signal according to a preset timing electrical signal, the processing chip is also configured to determine a luminous intensity change of the display pixel, and a feedback signal is transmitted when it is determined that luminous intensity of the display pixel or the display pixel array is not changed in the preset period, and the display pixel array comprises a discrete display pixel array or a continuous display pixel array.

3. The device for monitoring luminous intensity of display pixel according to claim 2, the optical component is further configured to change an optical path of the first reflected optical signal and to form the second reflected optical signal which enters the photo-detecting array at an incident angle smaller than a preset angle.

4. The device for monitoring luminous intensity of display pixel according to claim 2, further comprising a display driving adjustment circuit, the processing chip is further configured to determine if a luminous intensity of the display pixel reaches a preset display light intensity, if not, the feedback signal comprises a driving adjustment signal transmitted from the processing chip to the display driving adjustment circuit; and the display driving adjustment circuit is configured to adjust a drive current or a drive voltage of the display pixel with the luminous intensity not reaching the preset display light intensity in response to receiving the driving adjustment signal, so that the luminous intensity of the display pixel reaches the preset display light intensity.

5. The device for monitoring luminous intensity of display pixel according to claim 1, wherein the optical component comprises an optical shading component and/or a phase changing optical component, the optical shading component comprises a periodical pinhole array or a non-periodical pin hole array, the phase changing optical component comprises a photonic crystal structure, a micro-lens array structure, or a diffusing-scattering structure, the photonic crystal structure or the micro-lens array structure has a periodically changed refractive index, and the diffusing-scattering structure has a non-periodically changed refractive index; or the optical component is designed based on a compressed sampling method of a coded aperture or the digital holography.

6. The device for monitoring luminous intensity of display pixel according to claim 1, wherein the photo-detecting array comprises a plurality of pixel detection areas, each pixel detection area is provided with a pixel detection structure, each pixel detection structure comprises a pixel thin film circuit composed of at least one thin film transistor and a light detection component, the light detection component comprises a photodiode or a phototransistor.

7. The device for monitoring luminous intensity of display pixel according to claim 1, wherein the display comprises a self-luminous LED display.

8. The device for monitoring luminous intensity of display pixel according to claim 1, wherein a refractive index of the optical glue is smaller than a refractive index of the cover glass.

9. The device for monitoring luminous intensity of display pixel according to claim 8, wherein the cover glass comprises a cover glass substrate which is a part of the display, the plurality of display pixels are disposed on the cover glass substrate.

10. The device for monitoring luminous intensity of display pixel according to claim 1, the display pixel comprises a light emitting diode comprising a hole transport layer, a luminescent layer and an electron transport layer, and a bottom metal electrode layer and a transparent conductive layer;

the photo-detecting array is configured to receive the second reflected optical signal that is transmitted through the bottom metal electrode layer, and to receive another part of the optical light emitted by the luminescent layer that is transmitted through the electron transport layer and the bottom metal electrode layer.

* * * * *